United States Patent [19]

Chamness, Jr.

[11] 4,445,485

[45] May 1, 1984

[54] ENGINE FUEL SYSTEM

[76] Inventor: Addison B. Chamness, Jr., 2231 W. Lovers La., Dallas, Tex. 75235

[21] Appl. No.: 325,367

[22] Filed: Nov. 27, 1981

[51] Int. Cl.³ .............................................. F02M 31/08
[52] U.S. Cl. .................................. 123/546; 123/568; 123/575
[58] Field of Search ............... 123/525, 527, 533, 568, 123/575, 585, 546, 531

[56] References Cited

U.S. PATENT DOCUMENTS

| | | | |
|---|---|---|---|
| 3,481,144 | 12/1969 | Morrell | 123/575 |
| 3,496,919 | 2/1970 | Gerrard | 123/531 |
| 3,665,949 | 5/1972 | Rivard | 123/531 |
| 3,800,533 | 4/1974 | Zankowski | 123/531 |
| 3,894,520 | 7/1975 | Clawson | 123/531 |
| 3,968,775 | 7/1976 | Harpman | 123/557 |
| 4,064,840 | 12/1977 | Vierling | 123/1 A |
| 4,151,821 | 5/1979 | Wichman et al. | 123/527 |
| 4,224,904 | 9/1980 | Clerk | 123/531 |
| 4,323,046 | 4/1982 | Barber | 123/575 |
| 4,331,121 | 5/1982 | Stokes | 123/575 |

Primary Examiner—William A. Cuchlinski, Jr.
Attorney, Agent, or Firm—Peter J. Murphy

[57] ABSTRACT

A heat exchanger consists of an exhaust flow conduit mounted on and connected to the exhaust manifold. A partially enclosing housing or jacket defines a vaporizing chamber. A conduit communicates the vaporizing chamber with the inlet air throat for the intake manifold. A blending device mounted on the heat exchanger housing includes a mixing chamber for receiving an inert gas such as exhaust gas and one or more liquid fuel components. The mixing chamber may include a venturi whereby the flow of exhaust gas under pressure will draw liquid fuel and effect the mixing, vaporization and flow of that fuel mixture to the intake throat. The flow of the inert gas may be controlled in relation to the flow of inlet air. In another version the fuels are supplied to the blending device under pressure and under volume control related to the flow of inlet air, with the flow of pressurized exhaust gas effecting the flow of the vaporized fuel mixture through the heat exchanger to the inlet throat.

21 Claims, 4 Drawing Figures

_4,445,485_

ENGINE FUEL SYSTEM

This invention relates to a fuel system for an internal combustion engine, to provide for improved vaporization of liquid fuel components for the engine.

An object of this invention is to provide an improved fuel system for vaporizing more completely one or more liquid fuels or fuel components, thereby providing improved engine efficiency and fuel economy.

Another object of this invention is to provide an improved fuel system utilizing a pressurized substantially inert gas to effect the flow of vaporized fuel to the engine inlet throat.

A further object of this invention is to provide an improved fuel system enabling the use of substantially inert engine exhaust gases to effect the vaporization of fuel and the flow of vaporized fuel to the engine.

Still another object of this invention is to provide an improved system including a blending device utilizing pressurized substantially inert gas to effect the mixing, vaporization, and flow of a plurality of liquid fuel components.

A still further object of this invention is to provide a fuel system including a heat exchanger and blending device mounted on the engine exhaust manifold to utilize the heat generated therein.

These objects are accomplished broadly in a fuel system for use with an internal combustion engine having an intake manifold, an inlet air throat for the intake manifold, an air flow control in the inlet throat, and an exhaust manifold. A heat exchanger includes a vaporizing chamber, and the vaporizing chamber is connected to the inlet throat by a suitable conduit. A blending device is associated with the heat exchanger for mixing one or more liquid fuel components and a substantially inert gas and conveying that mixture to the vaporizing chamber of the heat exchanger. A pressurized substantially inert gas and one or more liquid fuel components are supplied to the blending device. The substantially inert gas effects the flow of the vaporized fuel through the heat exchanger to the inlet throat.

These objects are accomplished broadly in a method which includes the steps: varying the air flow in the air inlet throat in response to the engine needs; supplying one or more liquid fuel components and pressurized substantially inert gas to a mixing chamber; heating the mixture of inert gas and fuel components in the heat exchanger to vaporize the mixture; and conveying the mixture of substantially inert gas and fuel components through the heat exchanger to the inlet throat by means of the inert gas.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 1:
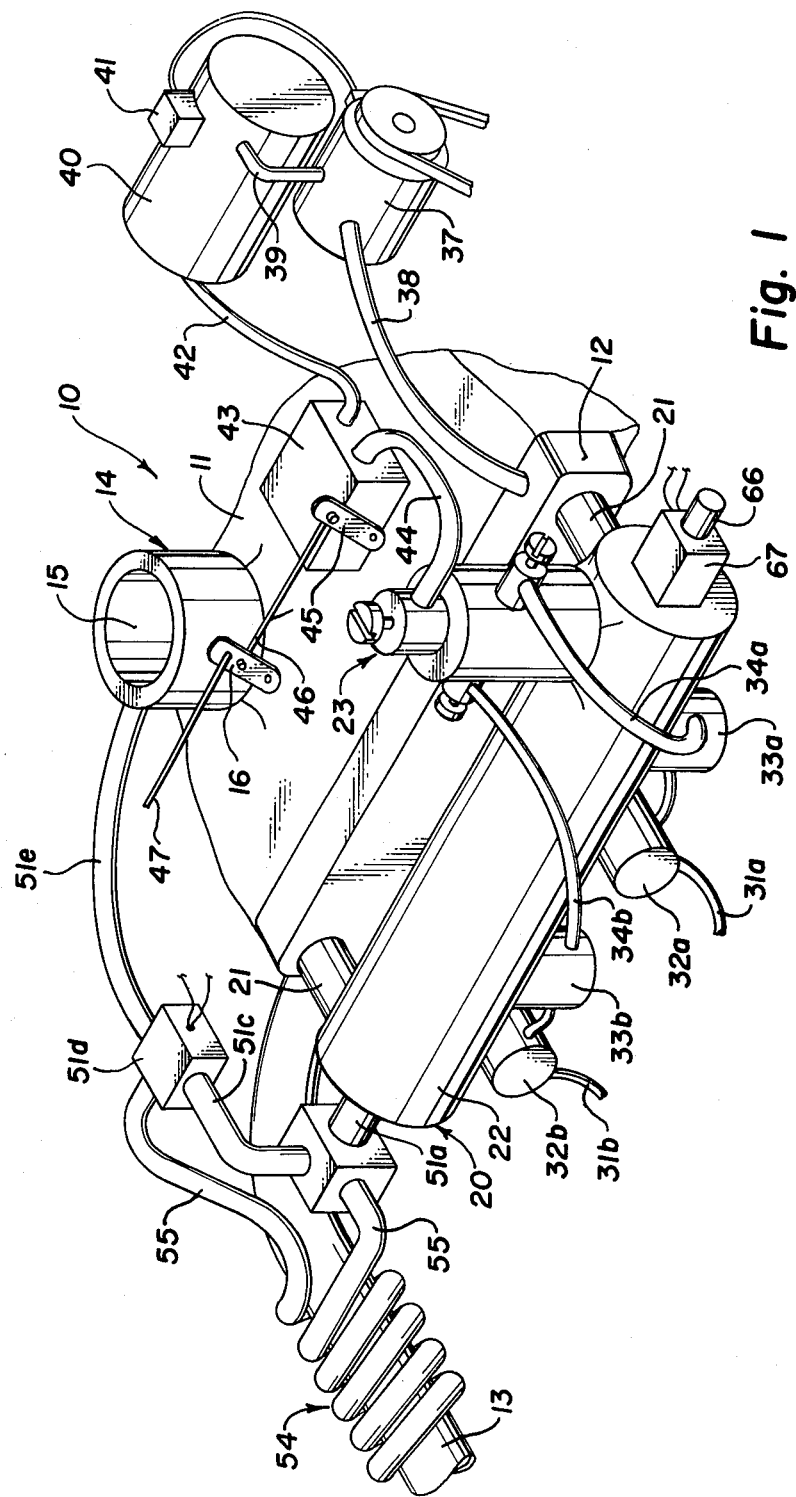
FIG. 1 is a perspective view of an engine and fuel system according to the invention.

FIG. 1 of the drawing is a fragmentary and somewhat diagrammatic illustration of one form of internal combustion engine 10 and associated fuel system according to the invention. The engine 10 is, in general, a conventional engine of the type which burns liquid gasoline fuel. The conventional components of such engine which are illustrated in the drawing include an intake manifold 11, usually disposed on the top of the engine block, an exhaust manifold 12, an exhaust pipe 13 and a carburetor 14 which is mounted on the top of the intake manifold.

The carburetor 14 does not include all of the components normally found with a carburetor for a gasoline burning engine; but is designated as a carburetor because it performs, at least partially, the function of mixing fuel vapor and air. In the illustrated form, the carburetor 14 would include a generally vertically disposed air inlet throat including a venturi 15, and would include a throttle valve operated by the control arm 16 for controlling air flow in the conventional manner. The carburetor throat would include a fuel inlet port for fuel vapors, supplied as will be described, and this port may open to the venturi 15 to assist in the flow of fuel to the carburetor if that is desired. An inlet air filter (not shown) may be mounted on the top of the carburetor in the usual manner.

Figure 2:
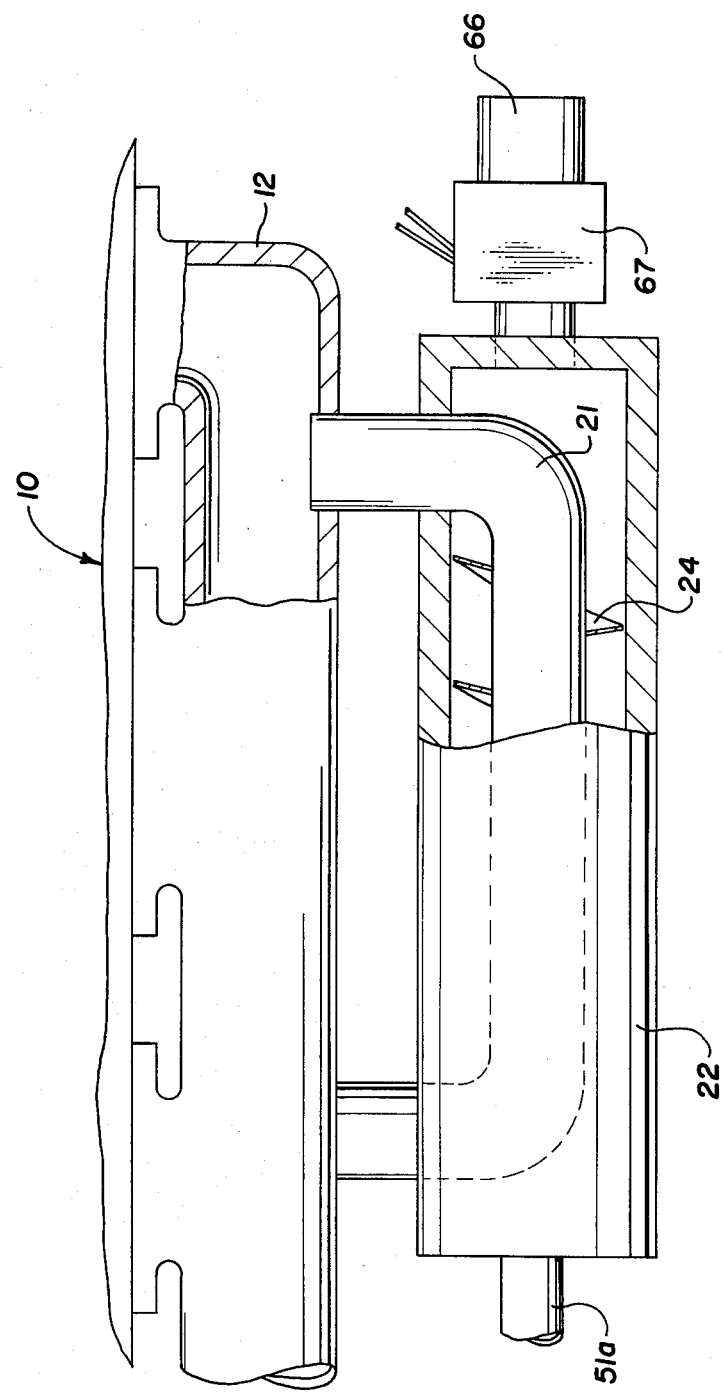
FIG. 2 is a sectional view of the engine exhaust manifold and the primary heat exchanger, taken in a generally horizontal plane in FIG. 1.
Figure 3:
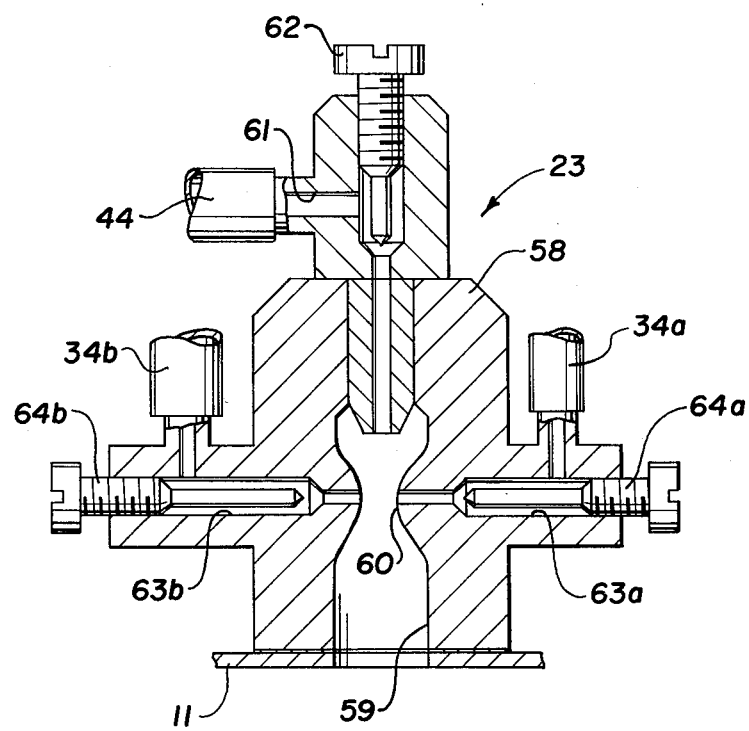
FIG. 3 is a vertical sectional view of the blending device illustrated in FIG. 1.

The fuel supply system includes a primary heat exchanger 20 which, in the illustrated form, is mounted directly on the intake manifold 11. As best seen in FIG. 2, this primary heat exchanger may include a U-shaped exhaust conduit 21 connected at both ends to the exhaust manifold to allow for the flow of exhaust gases therethrough, and a partially enclosing cylindrical jacket 22 which is sealed in relation to the exhaust conduit 21. The jacket defines a vaporizing chamber for the fuel mixture as will be described. A fuel blender 23, the details of which are illustrated in FIG. 3, is mounted on the top of the jacket 22; and this blender controls the admission of fuels into the vaporizing chamber. This blender is preferably mounted at the upstream end of the jacket in relation to the flow of fuel vapors; and suitable baffle means such as a spiral baffle 24 may be provided to provide an elongated or tortuous flow path for the fuel vapors through the primary heat exchanger.

The fuel system illustrated in FIG. 1 is referred to as an "atomizer system"; and means are provided for supplying two different fuels to the blender 23 or possibly one fuel and a noncombustible fuel component such as water. The components of the parallel systems for supplying two fuel components to the blender 23 are identified with reference numbers including the subscripts a and b respectively. For the "a" system which might supply gasoline for example, the fuel is pumped from a conventional tank (not shown) through a conduit 31a by a conventional fuel pump 32a to an intermediate bowl or reservoir 33a. In FIG. 1 the bowl 33a is mounted on the underside of the heat exchanger jacket 22; and with this type of mounting the fuel contained in the bowl may be preheated prior to passing to the blender 23. The bowl 33 is located below the respective inlet of the blender 23; and the fuel is drawn into the blender through a conduit 34a in a manner to be described.

In this "atomizer system" the flow of the fuels from the bowls 33a and 33b is effected by the flow of a substantially inert gas through the blender 23, which flow acting on an ejector principal draws the fuel from the bowls. For this system the level of fuel in fuel bowls 33a and 33b must necessarily be below the respective fuel inlets to the blender 23. In an alternative system, the bowls 33a and 33b may represent the primary fuel storage tanks or reservoirs, in which case the fuel pumps 32a and 32b would not be required.

In the illustrated system, the above mentioned substantially inert gas for effecting the fuel flow through the blender 23 is exhaust gas which is supplied to the blender under suitable control by the following system. The exhaust gas may be compressed by a suitable compressor 37 having its inlet communicated with the exhaust manifold by a conduit 38, and having its outlet communicating with a storage receiver 40 by a conduit 39. The compressor 37 may be belt driven by the engine in the usual manner; and the compressor may include an electrically operated clutch which responds to a pressure responsive switch 41 associated with the receiver 40. In this manner the pressure maintained in the receiver may be maintained within desired limits. From the receiver, the exhaust gas flows through a conduit 42 to a variable flow control valve 43, and thence through conduit 44 to the blender 23. The flow control valve 43 is of a type which responds to rotation of a control arm 45 to vary the rate of flow of the exhaust gas to the blender 23. The valve control arm 45 is connected by a link arm 46 to the throttle valve arm 15; which arm is in turn connected by a suitable link 47 which is connected to the appropriate throttle control for the engine such as the accelerator pedal of an automobile.

The operation of the blender 23 will be described in detail subsequently. The fuel mixture which passes through the primary heat exchanger 20 is a mixture of the vapors of two liquid fuel components from the bowls 33a and 33b and exhaust gas; and this mixture is heated and further vaporized in the primary heat exchanger and then passes to the carburetor 14 through a conduit 51 consisting of portions 51a, 51c and 51e and associated valves 51b and 51d. The conduit 51e is connected to the carburetor inlet port which opens to the throat above the throttle valve and possibly at a venturi to assist in the flow of the fuel mixture to the carburetor.

An auxiliary component of the fuel system is a super-heater 54 connected in series with the primary heat exchanger 20. The super heater consists of a conduit 55 formed into a coil or other association with the exhaust pipe 13, with the two ends of this super heater conduit connected to the valves 51b and 51d respectively. The valves 51b and 51d are three-way valves, solenoid operated for example, to provide for alternative flow either through the conduit portion 51c or through the super heater 54. The super heater may be employed where additional vaporization of the fuel is required, and may enable the use of a cheaper and less volatile fuel for the engine.

Referring now to FIG. 3 for a detailed description of the blender 23, this blender includes a main body or housing 58 providing a mixing channel or chamber 59, which channel includes a venturi throat 60. The housing defines an inlet passage 61 and associated adjustment valve 62 and inlet passages 63a and 63b with respective associated adjustment valves 64a and 64b. The adjustment valves 62, 64a and 64b function to provide balancing adjustments of the fluid flow, and also function as shut off valves if it is desired to shut off one or more of the respective inlet passages. The inlet passages 63a and 63b open to the venturi throat 60 so that the high velocity flow of exhaust gas through the chamber 69 creates a reduced pressure at the openings to the inlet passages 63a and 63b to draw liquid fuels from the respective bowls 33a and 33b.

An additional feature of the fuel system is the provision of an air inlet conduit 66 and associated control valve 67 at the upstream end of the primary heat exchanger jacket 22. The control valve 67 may be for example a solenoid operated two-way valve to either admit or not admit air to the jacket chamber as desired. It may be desirable to admit air at this point to be heated in the primary heat exchanger for the starting of the engine; and for this purpose the operation of the control valve 67 may be associated with the operation of a choke valve or plate within the throat of the carburetor 14. This may be a part of a manual choke control system wherein the flow of air through the carburetor throat is choked off and the simultaneous introduction of air through the inlet passage 66 to be mixed with the fuel in the primary heat exchanger will provide the desired enriched fuel mixture for the starting of the engine.

The operation of the system of FIGS. 1, 2 and 3 will now be briefly summarized. For all phases of engine operation, the flow of fuel through the heat exchangers and to the carburetor 14 is always effected by the positive flow of substantially inert gas, such as exhaust gas, as stored in the receiver 40 under suitable pressure. The volume of flow of this exhaust gas is controlled by the control valve 43 through the throttle mechanism; and the flow of this substantially inert gas through the blender 23 in turn controls the flow of the two fuel components into the blender and the primary heat exchanger. The mixing of the fuel components and the substantially inert gas is accomplished in the mixing chamber 59 of the blender and the fuel components are partially vaporized at this point. This mixture then passes through the primary heat exchanger where further vaporization and mixing of the fuel components occurs. Where desired, and if the system includes a super heater 54, the mixture may be passed through the super heater for complete vaporization, or alternatively the mixture may bypassed through the conduit portion 51c by suitable control of the valves 51b and 51d. If desired for more efficient performance, some air not sufficient to support combustion may be admitted to the primary heat exchanger through the inlet passage 66; and admission of air at this point may be particularly desirable during engine starting to provide a heated fuel air mixture, possibly coupled with some choking of the flow of principal inlet air at the carburetor.

Figure 4:
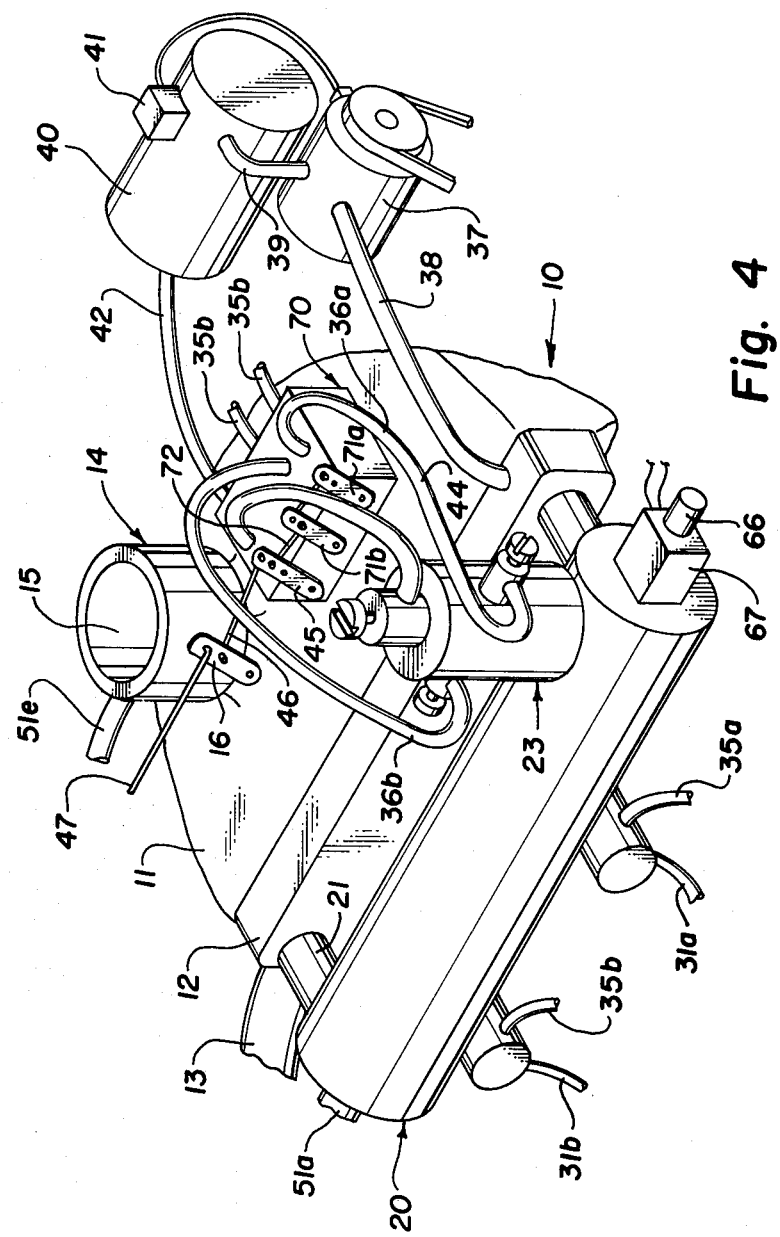
FIG. 4 is a fragmentary perspective view of a modified form of engine and fuel system based on FIG. 1.

Embodiment of FIG. 4

FIG. 4 of the drawing is a fragmentary and somewhat diagrammatic illustration of a modified form of engine and fuel system according to the invention. Utilizing principally the same components, the fuel system of FIG. 4 being identified as an "injector" system. In this system of FIG. 4, the components which correspond to the components of the FIG. 1 system will be identified by the same reference numbers. The system of FIG. 4 is identical to the system of FIG. 1 except in the following respects: (1) the bowls 33a and 33b for the fuel components are eliminated; (2) a multiple flow control valve 70 is provided in place of the variable flow control valve 43 to control not only the flow of the substantially inert exhaust gas, but also to control the flow of the liquid fuel components to the blender 23; and (3) the blender 23 may be identical, or may be slightly modified to eliminate the venturi throat 60 which is not essential to the injector system.

Referring now to the multiple flow control valve 70, this unit includes three individual flow control valves operated by respective control arms 45, 71a and 71b. The arm 71a controls an associated valve for the flow of one fuel component, and the arm 71b controls an associated valve for the other fuel component. The arms 71a and 71b are linked to the arm 45 by suitable adjustable links 72 to provide for adjusting the rate of opening and closing of the associated valves in relation to the exhaust gas valve controlled by the arm 45. These control arms are, in turn, linked to the throttle valve and its control arm 15 as with the previous system. It will be seen then that operation of the engine throttle control controls the flow of exhaust gas to the blender 23, controls the flow of the two fuel components to the blender 23, and controls the flow of inlet air through the throat of carburetor 14.

Referring to the flow of the liquid fuel components, the flow of one fuel component from a suitable tank is controlled by the fuel pump 32a, supplied by the conduit 31a. The fuel is pumped through conduit 35a to the control valve 70, and then passes through the conduit 36a to the inlet of the blender 23. The flow path components for the second fuel component are identified by the same reference numbers with the subscript b.

In this ejector system, the flow of the liquid fuel components to the blender 23 is effected by the respective fuel pumps; and the rate of fuel flow is effected by the respective flow control valves of the multiple valve 70. The flow of inert or exhaust gas to the blender 23 serves to effect the partial vaporization and mixing of the fuel components in the mixing chamber 59 of the blender; and also provides for the positive flow of the substantially inert gas and vaporized fuel mixture from the blender to the carburetor. This mixture is, of course, vaporized in the primary heat exchanger 20 and also, optionally, in the super heater 54 if desired. In other respects the system of FIG. 4 functions in the same manner as the system of FIG. 1. While, as mentioned, the fuel pumps may not be a requirement for the "atomizer system" of FIG. 1, the fuel pumps would be a requirement for the "injector system" of FIG. 4.

Another form of injection type system is disclosed in U.S. patent application Ser. No. 177,204, filed Aug. 11, 1980 entitled ENGINE FUEL VAPORIZING DEVICE AND SYSTEM, of which the inventor of the present invention is a co-inventor, now U.S. Pat. No. 4,323,044, issued Apr. 6, 1982.

Both the above described "atomizer system" and "injection system" include the compressor 37 and the receiver 40 for controlling the supply of the substantially inert exhaust gas to the blender. It is conceivable that these components may not be necessary to the functioning of the system, and that the inherent pressure within the exhaust manifold may be sufficient to effect the desired flow of exhaust gas through the blender. Advantages of providing the compressor and receiver are that an adequate supply of pressurized gas is always assured; and in particular a supply of pressurized gas is available for starting the engine to effect the flow of the fuel mixture to the carburetor. Another advantage is that the engine may be more responsive to acceleration, since the flow of exhaust gas to the blender will be increased concurrently with the opening of the throttle in the air inlet throat.

An alternative to the use of exhaust gas as the substantially inert gas, would be to provide a supply of pressurized gas such as carbon dioxide, for example.

Method

A method for controlling an internal combustion engine according to the invention may include some or all of the following steps:

The flow of air to the engine is varied in the carburetor air inlet throat in response to the engine needs;

A pressurized substantially inert gas and one or more liquid fuel components are supplied to a mixing chamber;

Some mixing of the substantially inert gas and fuel components is effected in the mixing chamber along with some vaporization of the liquid fuel components;

The mixture of substantially inert gas and fuel components is passed through a heat exchanger to effect further mixing and further vaporization of the mixture;

The mixture of substantially inert gas and vaporized fuel components is conveyed to the carburetor inlet throat by the flow of the substantially inert gas;

To assist in the flow of the mixture to the carburetor, the mixture may be drawn into the inlet throat by means of a venturi inlet throat responding to the flow of inlet air;

In one aspect of the method the flow of the substantially inert gas into and through the mixing chamber may be varied in direct relation to the flow of air through the inlet throat, and the flow of fuel components into the mixing chamber may be effected by an ejector in the mixing chamber responding to the flow of the substantially inert gas;

In another aspect of the method, the flow of fuel into the mixing chamber may be effected under positive pressure, with the flow of the respective components being varied in direct relation to the flow of inlet air in the inlet throat.

What has been described is a unique system and method for controlling the flow of fuel to an internal combustion engine. A particular feature of the invention is the utilization of a substantially inert gas, such as exhaust gas from the engine exhaust manifold, to (1) assist in the mixing of the fuel components, (2) to partially effect the vaporization of the liquid fuel components, and (3) to convey the vaporized fuel mixture through a heat exchanger and to the carburetor inlet throat for mixing with the inlet air. The system enables the utilization of a relatively compact heat exchanger associated directly with the exhaust manifold.

A particular feature of the invention is the provision of a blending device which enables the utilization of two types of fuel flow control systems: (1) one in which substantially inert gas is flowed through an ejector to draw the required amounts of fuel components in response to the flow of the substantially inert gas, and (2) the other in which the flow of substantially inert gas and liquid fuel components are each controlled directly and in direct relation to the flow of inlet air through the inlet throat of the engine.

While preferred embodiments of the invention have been illustrated and described, it will be understood by those skilled in the art that changes and modifications may be resorted to without departing from the spirit and scope of the invention.

What is claimed is:

1. In an internal combustion engine having an intake manifold, an inlet air throat for said intake manifold, an air flow control in said inlet throat, and an exhaust manifold; a fuel system comprising:

a heat exchanger including a vaporizing flow path for a fuel mixture and a separate flow path for exhaust gases flowing from said exhaust manifold; means connecting the outlet of said vaporizing flow path to said inlet air throat;

a blending device, for mixing fuel and a substantially inert gas, connected to the inlet of said vaporizing flow path;

means for supplying a pressurized substantially inert gas to said blending device; and means for supplying one or more liquid fuel components to said blending device;

means for controlling the supply of said one or more fuel components to said blending device in relation to the flow of air in said inlet throat;

said substantially inert gas effecting the flow of the mixture of said gas and fuel components through said vaporizing chamber to said inlet throat.

2. A fuel system as set forth in claim 1
said substantially inert gas comprising exhaust gas from said exhaust manifold; and conduit means communicating said exhaust manifold and said blending device for supplying said exhaust gas to said blending device.

3. A duel system as set forth in claim 2
flow control means in said exhaust gas conduit means for controlling the rate of flow of said exhaust gas in direct relation to the flow of air through said inlet throat.

4. A fuel system as set forth in claim 3
reservoirs for said fuel components disposed below said blending device; said blending device mixing chamber including ejector means responsive to the flow of said substantially inert gas for drawing said fuel components from said reservoirs into said mixing chamber.

5. A fuel system as set forth in claim 4
said fuel reservoirs being mounted on said heat exchanger, whereby the fuel components in said reservoirs are heated by said heat exchanger.

6. A fuel system as set forth in claim 4
said blending device including a mixing chamber having a venturi throat defining said ejector means, means for flowing said substantially inert gas through said venturi throat, and inlet passages for one or more liquid fuel components opening to said venturi throat, whereby the flow of said substantially inert gas effects the flow of said fuel components into said mixing chamber and effects the mixing of said fuel components and said substantially inert gas.

7. A fuel system as set forth in claim 1
fuel pumps for effecting the flow of fuel components to said blending device.

8. A fuel as set forth in claim 7
conduit means for supplying fuel components from said fuel pumps to said blending device, including variable flow control means; and means for controlling said variable flow control means in direct relation to the flow of air through said inlet throat.

9. A fuel system as set forth in claim 1
means for supplying a plurality of liquid fuel components to said blending device; means for controlling individually the flow of respective fuel components to said blending device in direct relation to the flow of air through said inlet throat.

10. A fuel system as set forth in claim 1
air valve means communicating said vaporizing flow path of said heat exchanger with atmosphere, for admitting a selected quantity of air into said vaporizing flow path.

11. A fuel system as set forth in claim 1
said blending device including a mixing chamber, means for effecting the flow of said substantially inert gas through said mixing chamber, said inlet means for effecting the flow of said fuel components into said mixing chamber for mixing with said inert gas.

12. A fuel system as set forth in claim 1
said heat exchanger comprising an elongated conduit having both ends communicating with said exhaust manifold whereby said conduit is open to the flow of exhaust gases of said manifold, and a housing partially enclosing said conduit in sealed relation to define therewith said vaporizing flow path;
said blending device being mounted on said housing.

13. A fuel system as set forth in claim 1
an exhaust pipe for conveying exhaust gases from said exhaust manifold; a second heat exchanger mounted on said exhaust pipe; and conduit means connecting vaporizing flow paths of said first and second heat exchangers in series with said inlet throat.

14. An exhaust system as set forth in claim 13
bypass conduit means and associated control means for selectively bypassing said second heat exchanger.

15. A fuel system as set forth in claim 1
said air inlet throat having a venturi; and said fuel mixture conduit means opening to said inlet throat at said venturi to assist in effecting the flow of said fuel mixture into said inlet throat.

16. A fuel system as set forth in claim 1
means for controlling the supply of said substantially inert gas to said blending device in relation to the flow of air in said inlet manifold.

17. A fuel system as set forth in claim 16
said means for controlling the supply of said one or more fuel components to said blending device comprising means responsive to the flow of said substantially inert gas in said blending device.

18. A method for controlling an internal combustion engine comprising the steps
varying the air flow rate in an in air inlet throat in response to the engine power demand;
mixing one or more liquid fuel components with a pressurized substantially inert gas;
varying the flow of fuel components into said mixing chamber in direct relation to the flow of air in said inlet throat;
conveying the mixture of said substantially inert gas and fuel components to said inlet throat by means of said substantially inert gas;
heating said mixture of substantially inert gas and fuel components in a heat exchanger to vaporize said mixture, prior to the conveying of said mixture to said inlet throat.

19. A method as set forth in claim 18 including
varying the flow of substantially inert gas through said mixing chamber in direct relation to the flow of air through said inlet throat;
and providing an ejector in said mixing chamber to effect the flow of fuel components into said mixing chamber in response to the flow of said substantially inert gas.

20. A method as set forth in claim 18 including varying the flow of substantially inert gas through said mixing chamber in direct relation to the flow of air through said inlet throat.

21. In an internal combustion engine having an intake manifold, an inlet air throat for said intake manifold, an air flow control in said inlet throat, and an exhaust manifold; a fuel system comprising a heat exchanger including a vaporizing flow path for a fuel mixture and a separate flow path for exhaust gases flowing from said exhaust manifold; means connecting the outlet of said vaporizing flow path to said inlet air throat;

a blending device connected to the inlet of said vaporizing flow path;

means for supplying one or more liquid fuel components to said blending device;

means for supplying pressurized exhaust gas to said blending device, including conduit means communicating said exhaust manifold and said blending device;

said conduit means for said exhaust gas including a compressor for additionally compressing said gas, and a receiver for receiving the compressed gas from said compressor; and pressure control means for maintaining the pressure within said receiver between selected limits.

said exhaust gas effecting the flow of the mixture of said gas fuel components through said vaporizing chamber to said inlet throat.

* * * * *